United States Patent
Myokan et al.

(10) Patent No.: US 9,866,818 B2
(45) Date of Patent: Jan. 9, 2018

(54) IMAGE PROCESSING APPARATUS AND METHOD, IMAGE PROCESSING SYSTEM AND PROGRAM

(71) Applicants: SONY CORPORATION, Tokyo (JP); SONY COMPUTER ENTERTAINMENT INC., Tokyo (JP)

(72) Inventors: Yoshihiro Myokan, Kanagawa (JP); Hideki Oyaizu, Tokyo (JP); Nodoka Tokunaga, Tokyo (JP); Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 758 days.

(21) Appl. No.: 14/044,065

(22) Filed: Oct. 2, 2013

(65) Prior Publication Data

US 2014/0125772 A1    May 8, 2014

(30) Foreign Application Priority Data

Nov. 2, 2012   (JP) .................. 2012-243180

(51) Int. Cl.
  *H04N 13/02*     (2006.01)
(52) U.S. Cl.
  CPC ..... *H04N 13/0246* (2013.01); *H04N 13/0239* (2013.01)
(58) Field of Classification Search
  USPC ......................................................... 348/47
  See application file for complete search history.

(56) References Cited

U.S. PATENT DOCUMENTS

2007/0005293 A1   1/2007  Maeda et al.
2009/0297020 A1*  12/2009 Beardsley ............. G06T 7/0057
                                                382/154

FOREIGN PATENT DOCUMENTS

CN    102289803 A    12/2011
JP    2006-250889     9/2006
JP    2011-253376    12/2011

OTHER PUBLICATIONS

Z. Zhang, "A flexible new technique for camera calibration", IEEE Transactions on Pattern Analysis and Machine Intelligence, 22(11): 1330-1334, 2000.
Sep. 1, 2016, CN communication issued for related CN application No. 201310462079.5.

* cited by examiner

*Primary Examiner* — Mikhail Itskovich
(74) *Attorney, Agent, or Firm* — Paratus Law Group, PLLC

(57) ABSTRACT

There is provided an image processing apparatus including a plurality of imaging units included in a stereo camera, the plurality of imaging units being configured to image a first chart pattern including a pattern that is a plurality of feature points and a mirror surface, and a correction parameter calculation unit configured to calculate a correction parameter that corrects a gap of the plurality of imaging units, based on the pattern included in the first chart pattern imaged by the plurality of imaging units and a pattern mirrored in the mirror surface.

13 Claims, 14 Drawing Sheets

FIG. 9
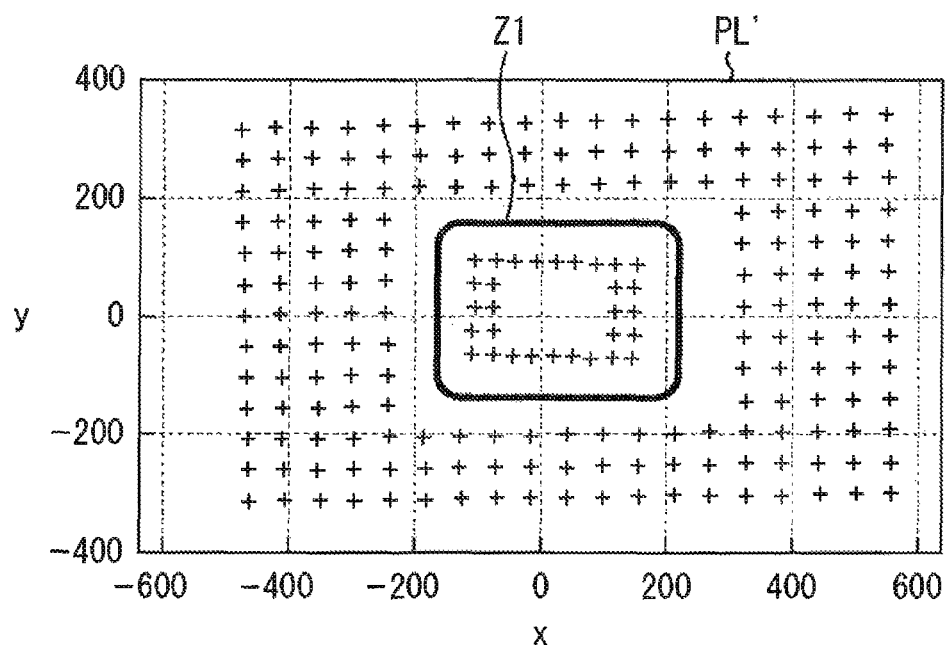
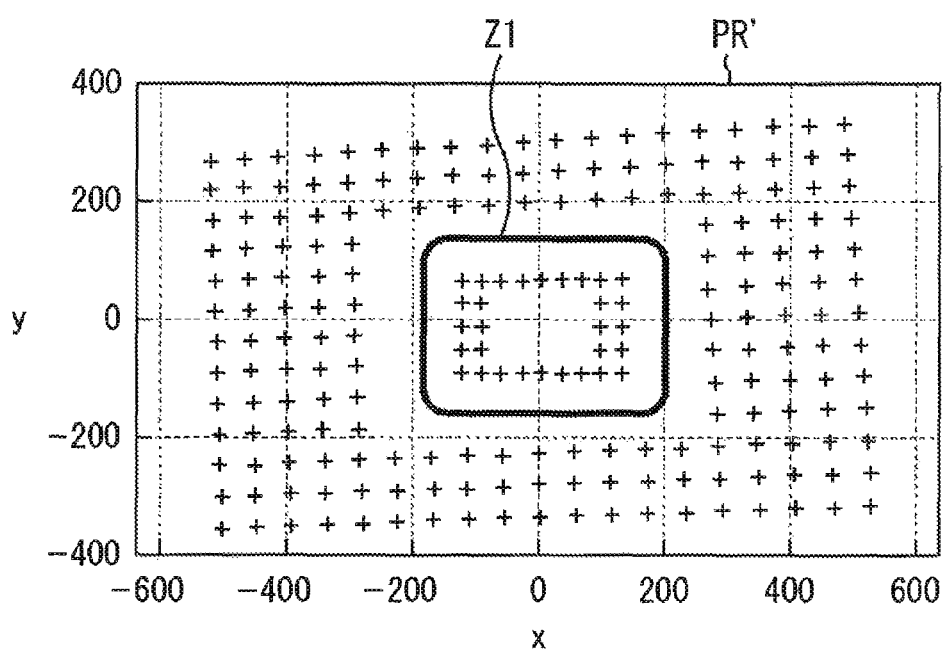

IMAGE PROCESSING APPARATUS AND METHOD, IMAGE PROCESSING SYSTEM AND PROGRAM

CROSS REFERENCE TO RELATED APPLICATIONS

This application claims the benefit of Japanese Priority Patent Application JP 2012-243180 filed Nov. 2, 2012, the entire content of which is incorporated herein by reference.

BACKGROUND

The present disclosure relates to an image processing apparatus and method, an image processing system and a program. Specifically, the present disclosure relates to an image processing apparatus and method, image processing system and program that can easily realize calibration of multiple cameras, which take stereo images, at high accuracy in a small space.

In general, a technique that can take a three-dimensional image by the use of multiple cameras is common.

As a method of generating a three-dimensional image, there is known a general method of forming a stereo camera by setting up cameras of two different viewpoints, calculating the disparity based on stereo images taken by this stereo camera and generating a three-dimensional image by the use of this disparity.

By the way, although it is premised that the cameras of two different viewpoints used herein is set up in an appropriate direction, it is known that a certain physical gap is generated no matter how they are set up. Therefore, generally, by taking images formed with a chart pattern with respect to respective imaging directions of the cameras of two viewpoints and calculating correction parameters by calibration in advance using the imaging results, actual imaging results are corrected by these correction parameters and used.

As a calibration method of this stereo camera, projective transformation parameters are calculated by taking a plurality of images of a chart pattern on which multiple feature points whose position relationship is known are printed while changing viewpoints, and the calibration is realized (for example, see "A Flexible New Technique for Camera Calibration, http://research.microsoft.com/~zhang").

However, in this method, since the chart pattern is photographed several times in different viewpoints, it is requested to move the chart pattern or move the cameras, which increases the adjustment man-hour.

Therefore, as a method of performing calibration only by one imaging so as not to increase the adjustment man-hour in "A Flexible New Technique for Camera Calibration, http://research.microsoft.com/~zhang," there is suggested a method of overlapping two calibration chart patterns with permeability, photographing two or more chart patterns with different depths at the same time and calculating correction parameter (for example, see JP 2006-250889A).

However, in the techniques in both "A Flexible New Technique for Camera Calibration, http://research.microsoft.com/~zhang" and JP 2006-250889A, when the gap angle of a camera (i.e., imaging area) with respect to the epipolar line (i.e., baseline) is estimated and corrected, it is requested to measure the geometrical position relationship of two or more feature points with different depths at the sub-pixel precision.

Therefore, there is suggested a technique that, by taking a texture image including a different depth from a plane chart pattern at the same time and minimizing the error amount of stereo matching of the right and left images, it is possible to easily and accurately correct the tilt of right and left camera imaging areas with respect to the baseline direction (=the epipolar line of the right and left cameras) of a correction target camera that fails to perform correction only by plane detection of one image (first depth) (for example, JP 2011-253376A).

SUMMARY

However, by the methods in JP 2006-250889A and JP 2011-253376A, when images with different depths are taken, a space in the depth direction is requested to be sufficiently ensured, and, since it is requested to ensure a sufficiently wide space to perform calibration on a stereo camera produced in a factory, the manufacturing cost increases.

The present disclosure is made in view of such conditions and especially designed to provide a mirror (mirror surface) to one chart pattern, estimate the gap angle of two cameras (i.e., imaging areas) with respect to the epipolar line (i.e., baseline) from feature points with different depths calculated from an image including a pattern on the chart pattern and a pattern mirrored on the mirror, and calculate correction parameters based on the estimated gap angle.

According to an embodiment of the present disclosure, there is provided an image processing apparatus including a plurality of imaging units included in a stereo camera, the plurality of imaging units being configured to image a first chart pattern including a pattern that is a plurality of feature points and a mirror surface, and a correction parameter calculation unit configured to calculate a correction parameter that corrects a gap of the plurality of imaging units, based on the pattern included in the first chart pattern imaged by the plurality of imaging units and a pattern mirrored in the mirror surface.

The correction parameter calculation unit may calculate a correction parameter that corrects a gap in three axis directions of two of the plurality of imaging units and a gap of a rotation angle of the two imaging units with respect to a baseline.

The gap of the rotation angle of the two imaging units with respect to the baseline may include a gap of a rotation angle that is vertical to the baseline and is obtained by regarding an imaging direction of the imaging units as an axis, and a gap of a rotation angle that is vertical to the baseline and is obtained by regarding a direction vertical to the imaging direction of the imaging unit as an axis.

The correction parameter calculation unit may calculate the correction parameter that corrects the gap in the three axis directions of the two imaging units and the gap of the rotation angle of the two imagine units with respect to the baseline, using a distance from the imaging units to the first chart pattern, a distance from the imaging units to the mirror surface provided in the first chart pattern, and a distance between the first chart pattern and a second chart pattern as a known disparity.

The plurality of imaging units may image the pattern included in the first chart pattern and a pattern included in a second chart pattern mirrored in the mirror surface.

The second chart pattern may include a mirror surface. The plurality of imaging units may image the pattern included in the first chart pattern and a pattern which is mirrored in the mirror surface of the first chart pattern, mirrored in the mirror surface forming the second chart pattern and included in the first chart pattern.

According to an embodiment of the present disclosure, there is provided an image processing method including performing, by a plurality of imaging units included in a stereo camera image, imaging processing of imaging a first chart pattern including a pattern that is a plurality of feature points and a mirror surface, and performing correction parameter calculation processing of calculating a correction parameter that corrects a gap of the plurality of imaging units, based on a pattern included in a chart pattern imaged in multiple times of the imaging processing and a pattern mirrored in the mirror surface.

According to an embodiment of the present disclosure, there is provided a program for causing a computer to execute the processing of imaging a first chart pattern including a pattern that is a plurality of feature points and a mirror surface, by a plurality of imaging units included in a stereo camera, and calculating a correction parameter that corrects a gap of the plurality of imaging units, based on a pattern included in a chart pattern imaged in multiple times of processing in the imaging step and a pattern mirrored in the mirror surface.

According to another embodiment of the present disclosure, there is provided an image processing system including an image processing apparatus including a plurality of imaging units, and a chart pattern configured to calibrates on an imaging direction of the imaging units. The chart pattern includes a pattern that is a plurality of feature points and provided in a position facing the plurality of imaging units, and a mirror surface. The image processing apparatus includes the plurality of imaging units that are included in a stereo camera and image the chart pattern, and a correction parameter calculation unit that calculates a correction parameter which corrects a gap of the plurality of imaging units, based on the pattern included in the chart pattern imaged by the plurality of imaging units and a pattern mirrored in the mirror surface.

According to a first embodiment of the present disclosure, a plurality of imaging units forming a stereo camera image a first chart pattern including a pattern as a plurality of feature points and a mirror surface, and a correction parameter that corrects a gap of the plurality of imaging units is calculated based on the pattern included in the chart pattern imaged by the plurality of imaging units and a pattern mirrored in the mirror surface.

According to a second embodiment of the present disclosure, the image processing apparatus images a chart pattern including a pattern as a plurality of feature points and a mirror surface by a plurality of imaging units forming a stereo camera, and a correction parameter that corrects a gap of the plurality of imaging units is calculated based on the pattern included in the chart pattern imaged by the plurality of imaging units and a pattern mirrored in the mirror surface.

The image processing apparatuses and image processing systems of the first and second embodiments of the present disclosure may be independent apparatuses and systems or blocks that perform image processing.

According to one or more of embodiments of the present disclosure, even in a limited space, it is possible to easily realize the calibration of a stereo camera at high accuracy.

BRIEF DESCRIPTION OF THE DRAWINGS

FIG. 9 is a diagram illustrating an example of feature points found by a pattern of a photographed chart pattern;

DETAILED DESCRIPTION OF THE EMBODIMENT(S)

Figure 1:
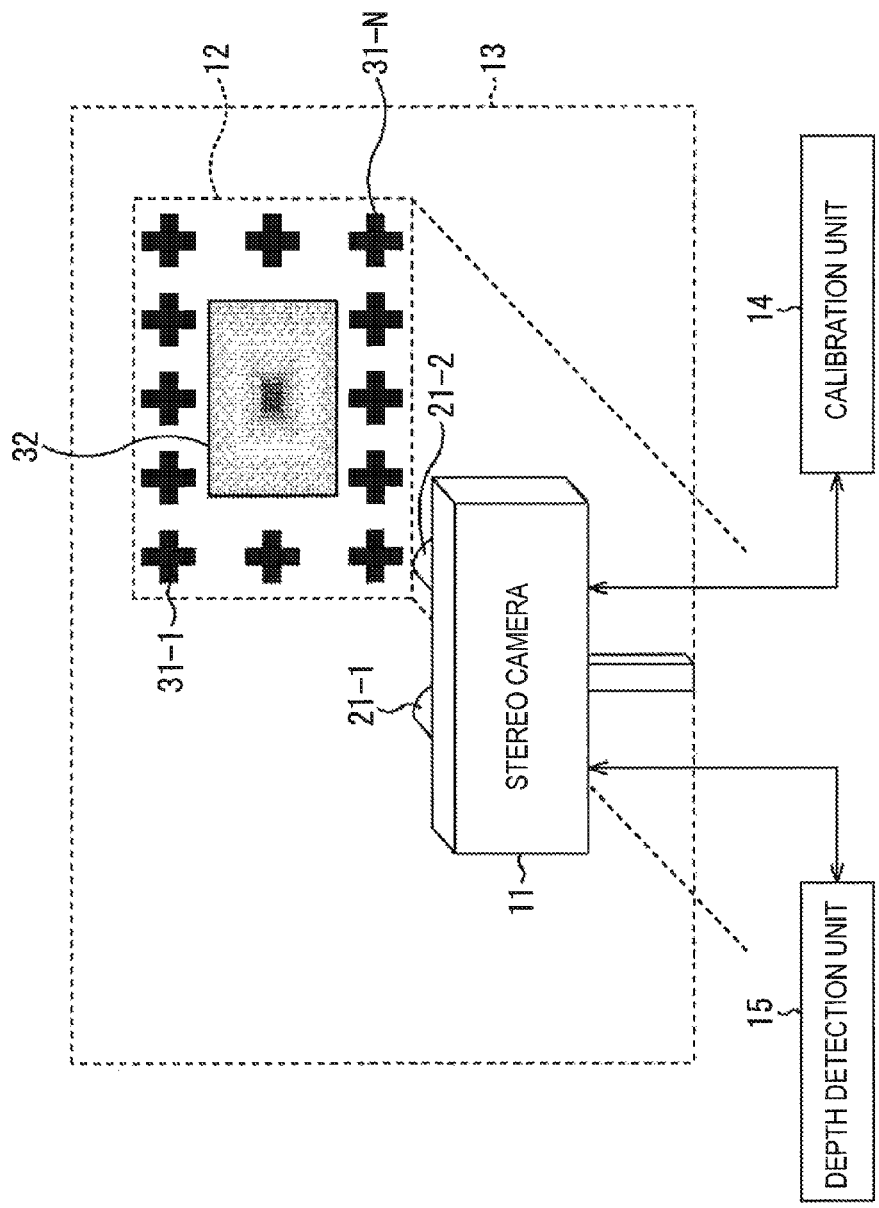
FIG. 1 is a diagram indicating a configuration example of the appearance of an embodiment of an image processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<Configuration Example of Appearance of Image Processing System>

FIG. 1 illustrates a configuration example of the appearance of one embodiment of an image processing system to which the present disclosure is applied. In the image processing system in FIG. 1, first, imaging units 21-1 and 21-2 of a stereo camera 11 photograph a chart pattern 12 which includes patterns 31-1 to 31-N and in which a mirror 32 is further provided. At this time, in addition to the pattern 31-1 to 31-N of the chart pattern 12, the imaging units 21-1 and 21-2 of the stereo camera 11 photographs other patterns than the chart pattern 12 mirrored in the mirror 32 or a chart pattern 13 formed with a texture, and supplies it to a calibration unit 14.

Therefore, the calibration unit 14 calculates a correction parameter that corrects the gap between the imaging units 21-1 and 21-2, on the basis of two images taken by the imaging units 21-1 and 21-2, and causes the stereo camera 11 to store it. In addition, when implementing depth detection processing by the use of the stereo camera 11, a depth detection unit 15 corrects the images taken by the imaging units 21-1 and 21-2 of the stereo camera 11 by the use of the correction parameter and detects a disparity image (i.e., depth image).

To be more specific, the image processing system in FIG. 1 includes the stereo camera 11, the chart pattern 12, the chart pattern 13, the calibration unit 14 and the depth detection unit 15. The stereo camera 11 includes the imaging units 21-1 and 21-2 which are arranged at predetermined intervals in the horizontal direction and which take images in the same direction. In the calibration processing, the stereo camera 11 photographs the chart pattern 12 in which the mirror 32 is provided, by the imaging units 21-1 and 21-2, and supplies two taken images to the calibration unit 14. Subsequently, the stereo camera 11 stores a correction parameter calculated by the calibration processing based on the two images in the calibration unit 14.

Also, in the depth detection processing, the stereo camera 11 takes images by the imaging units 21-1 and 21-2, supplies the images to the depth detection unit 15 and supplies the correction parameter stored in the calibration processing to the depth detection unit 15 in response to the images. After correcting the images taken by the stereo camera 11 by the use of the correction parameter, the depth detection unit 15 detects a disparity image on the basis of the two corrected images.

Figure 2:
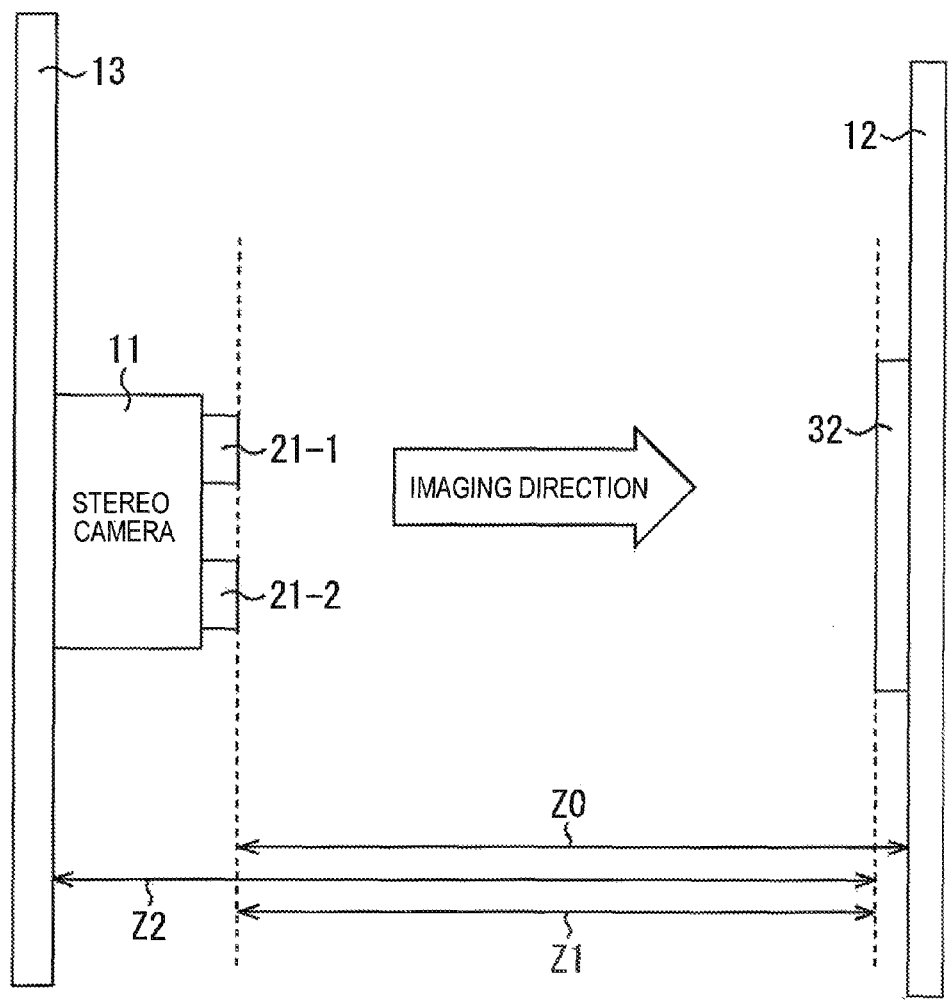
FIG. 2 is a diagram illustrating one example of the layout of a stereo camera and chart pattern in the image processing system in FIG. 1.
Figure 3:
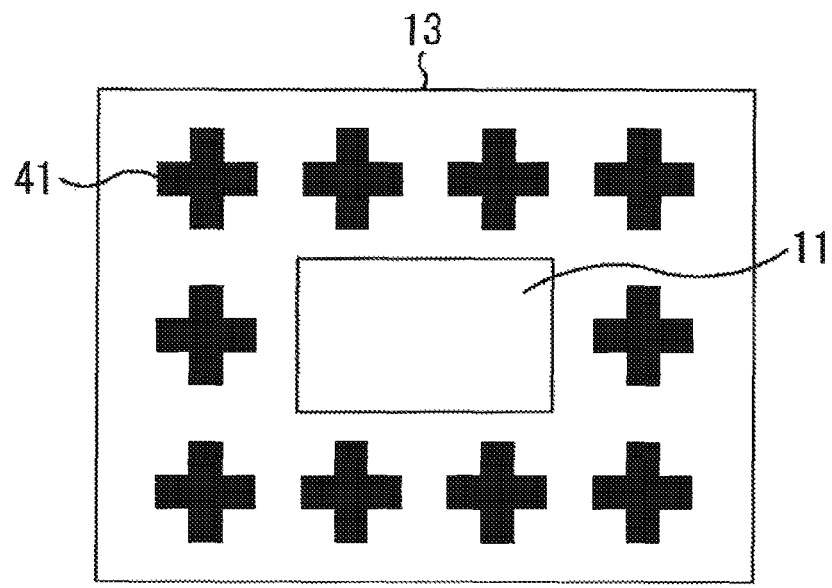
FIG. 3 is a diagram illustrating an example of a chart pattern on the stereo camera side in FIG. 2.

As illustrated in FIG. 2, the chart pattern 12 is provided in parallel with respect to a surface in which the imaging units 21-1 and 21-2 are provided in the facing positions with respect to the stereo camera 11, and the mirror 32 is provided in the substantially front position of the stereo camera 11. Moreover, behind the stereo camera 11, the chart pattern 13 is provided in parallel in a position facing the chart pattern 12. As illustrated in FIG. 3, the chart pattern 13 includes a pattern 41. By such a configuration, the imaging units 21-1 and 21-2 of the stereo camera 11 photographs the patterns 31-1 to 31-N of the chart pattern 12 and photographs the chart pattern 13 including the pattern 41 shown in FIG. 3, where the chart pattern 13 is provided on the back of the stereo camera 11 and mirrored in the mirror 32 provided in the chart pattern 12. Since the images taken in this way include the pattern 31 provided on the chart pattern 12 and the pattern 41 mirrored in the mirror 32, it follows that one image includes the patterns with different distances from the imaging units 21-2 and 21-2. As a result, it is not requested to photograph the patterns with different distances as respective images.

Figure 4:
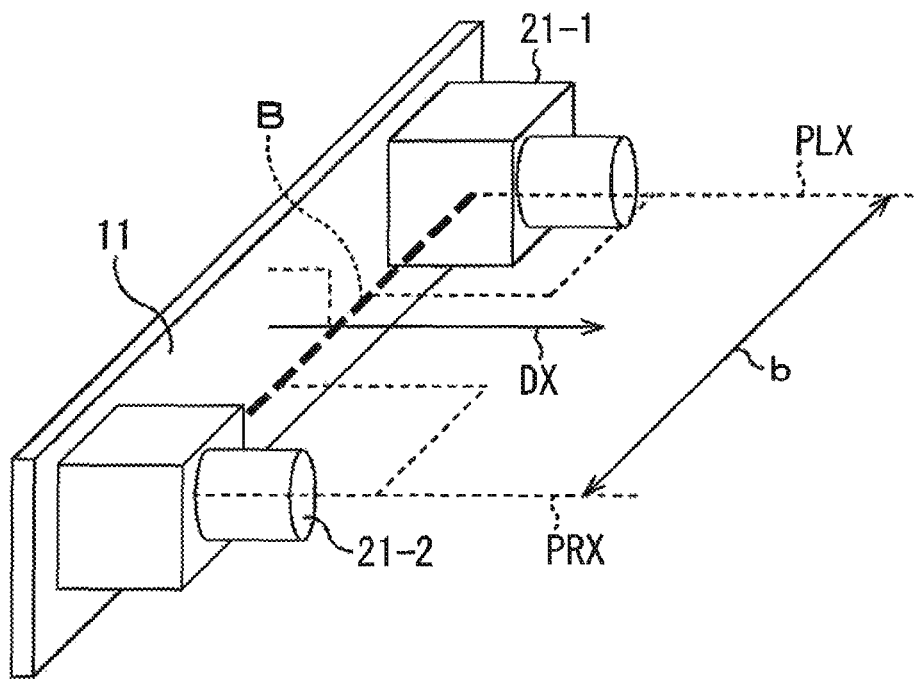
FIG. 4 is a diagram illustrating an appearance configuration example of a stereo camera in the image processing system in FIG. 1.

As illustrated in FIG. 4, the imaging directions of the imaging units 21-1 and 21-2 of the stereo camera 11 are directions PLX and PRX which are parallel to direction DX vertical to a chassis forming the stereo camera 11 and which are vertical to straight baseline B connecting the positions in which the imaging units 21-1 and 21-2 are installed. Also, in the following, it is assumed that the installation interval between the imaging units 21-1 and 21-2 is distance b along baseline B. Moreover, as illustrated in FIG. 2, it is assumed that the distance between the imaging areas of the imaging units 21-1 and 21-2 of stereo camera 11 and the chart pattern 12 is distance Z0, the distance between the imaging areas of the imaging units 21-1 and 21-2 of the stereo camera 11 and the mirror 32 is distance Z1, and the distance between the from surface of the mirror 32 and the chart pattern 13 is distances Z2.

The calibration unit 14 performs the calibration processing, calculates a correction parameter that corrects the imaging direction of the imaging units 21-1 and 21-2, on the basis of the images supplied from the stereo camera 11, and stores it in the stereo camera 11.

The depth detection unit 15 acquires the images taken by the stereo camera 11 and acquires the correction parameter which is calculated by the calibration processing and which is supplied with the stereo camera 11. Subsequently, the depth detection unit 15 corrects the images supplied from the stereo camera 11 by the use of the correction parameter, calculates the distance in a pixel unit on the basis of the corrected images and detects a disparity image (i.e., depth image).

<Function to Realize Each Configuration of Image Processing System>

Figure 5:
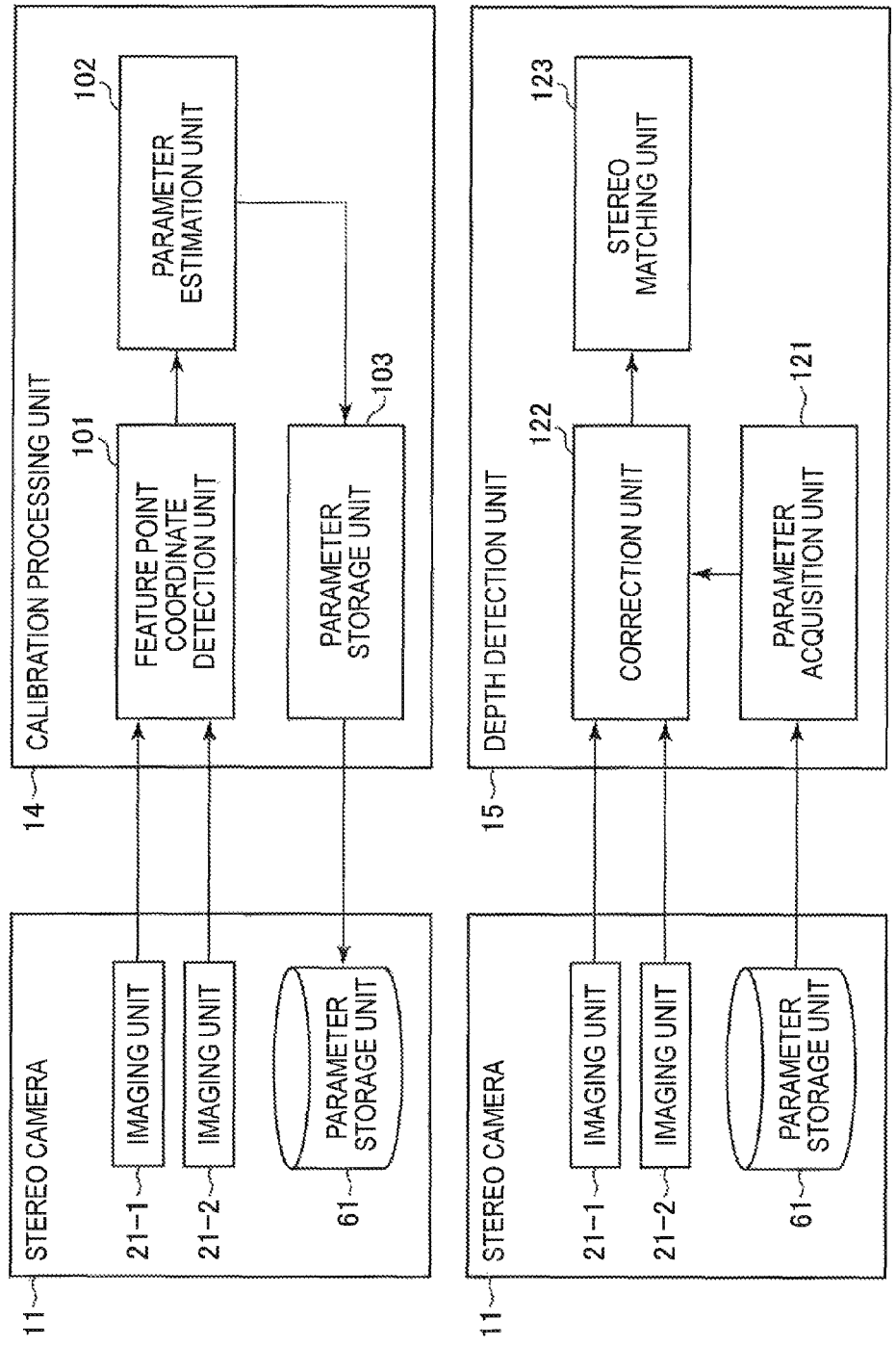
FIG. 5 is a functional block diagram to realize a function of the image processing system in FIG. 1.

Next, with reference to the functional block diagram in FIG. 5, the function to realize each configuration of the image processing system in FIG. 1 is described. Also, the configuration of the upper side of FIG. 5 illustrates a configuration when the calibration processing is performed in the stereo camera 11 and the calibration unit 14, and the configuration of the lower side of FIG. 5 illustrates a configuration when the depth detection processing is performed in the stereo camera 11 and the depth detection unit 15.

The stereo camera 11 includes the imaging units 21-1 and 21-2 and a parameter storage unit 61. The imaging units 21-1 and 21-2 include imaging elements such as a CCD (Charge Coupled Device) and CMOS (Complementary Metal Oxide Semiconductor). The imaging units 21-1 and 21-2 are arranged with an interval of predetermined distance b in the horizontal direction, photograph the chart pattern 12 including the mirror 32, in the same direction with respect to baseline B formed with the straight line connecting the installation positions of the imaging units 21-1 and 21-2, and supply the result to the calibration unit 14 when performing calibration processing on the taken images. Moreover, in the depth detection processing, the imaging units 21-1 and 21-2 supply the taken images to the depth detection unit 15. Here, in a case where the imaging units 21-1 and 21-2 are not specifically distinguished from each other, they may be simply referred to as "imaging unit 21" and the same applies to other components.

The parameter storage unit 61 stores the correction parameter calculated by the calibration processing in the calibration unit 14 and supplies the stored correction parameter to the depth detection unit 15 together with the taken images in the depth detection processing.

The calibration unit 14 includes a feature point coordinate detection unit 101, a parameter estimation unit 102 and a parameter storage unit 103.

The feature point coordinate detection unit 101 detects the coordinates of a feature point including an intersection point of patterns in the images supplied from the stereo camera 11, in the order of sub-pixels, and supplies it to the parameter estimation unit 102.

The parameter estimation unit 102 estimates a correction parameter requested for the calibration in the imaging units 21-1 and 21-2 of the stereo camera 11 on the basis of the feature point information, and supplies the estimated correction parameter to the parameter storage unit 103.

The parameter storage unit 103 causes the parameter storage unit 61 of the stereo camera 11 to save and store the correction parameter supplied from the calibration unit 14.

The depth detection unit 15 includes a parameter acquisition unit 121, a correction unit 122 and a stereo matching unit 123. The parameter acquisition unit 121 reads and acquires the correction parameter stored in the parameter storage unit 61 of the stereo camera 11 and supplies it to the correction unit 122.

In the depth detection processing, the correction unit 122 acquires two images taken by the imaging units 21-1 and 21-2 of the stereo camera 11, performs correction using the correction parameter supplied from the parameter acquisition unit 121 and supplies the corrected images to the stereo matching unit 123.

The stereo matching unit 123 calculates the distance in a pixel unit from the two corrected images by stereo matching processing and generates and outputs a disparity image as a depth detection result.

<Calibration Processing>

Figure 6:
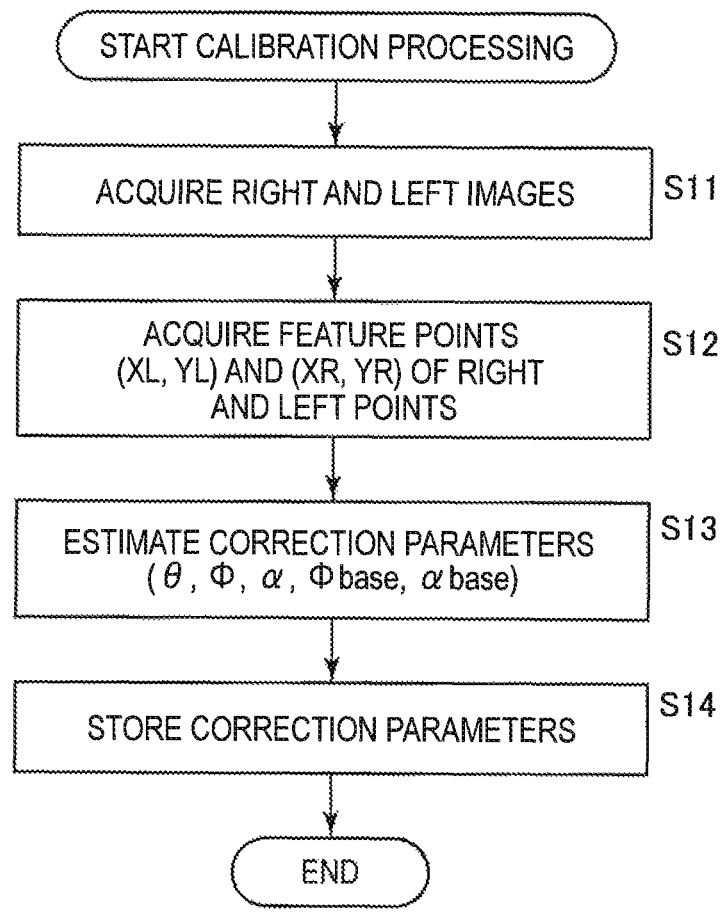
FIG. 6 is a flowchart to describe calibration processing.

Next, with reference to the flowchart in FIG. 6, the calibration processing is described.

In step S11, the stereo camera 11 photographs a stereo image including two right and left images by the use of the imaging units 21-1 and 21-2, and supplies it to the calibration unit 14. At this time, the feature point coordinate detection unit 101 of the calibration unit 14 acquires the image supplied from the stereo camera 11.

In step S12, the feature point coordinate detection unit 101 detects the coordinates of feature points that are patterns from the acquired right and left images, and supply them to the parameter estimation unit 102. That is, for example, in a case where the right and left images are images PL and PR in FIG. 7, the feature point coordinate detection unit 101 detects the positions of the intersections of corresponding "+" patterns PTL and PTR in the sub-pixel order and detects them as (XL,YL) and (XR,YR).

Here, regarding pixel-unit coordinates (xL, yL) and (xR, yR) of the feature points photographed by the imaging units 21-1 and 21-2 corresponding to the right and left cameras, when the pixel pitch of the imaging units 21-2 and 21-2 is p [mm/pixel] and the focal length is f [mm], the distance on the imaging area can be expressed by following Equations (1) to (4) when the lens focal length is virtually assumed to be 1.

$$XL = xL \times p/f \quad (1)$$

$$YL = yL \times p/f \quad (2)$$

$$XR = xR \times p/f \quad (3)$$

$$YR = yR \times p/f \quad (4)$$

Therefore, in the following explanation, if not otherwise specified, the feature point coordinates are expressed by the coordinates on the imaging area in a case where the focal distance is assumed to be virtually 1 as described above. Moreover, the coordinate shift due to lens distortion may be optionally corrected so as to provide a pinhole camera model, and ideal coordinates are assumed to be input.

Figure 7:
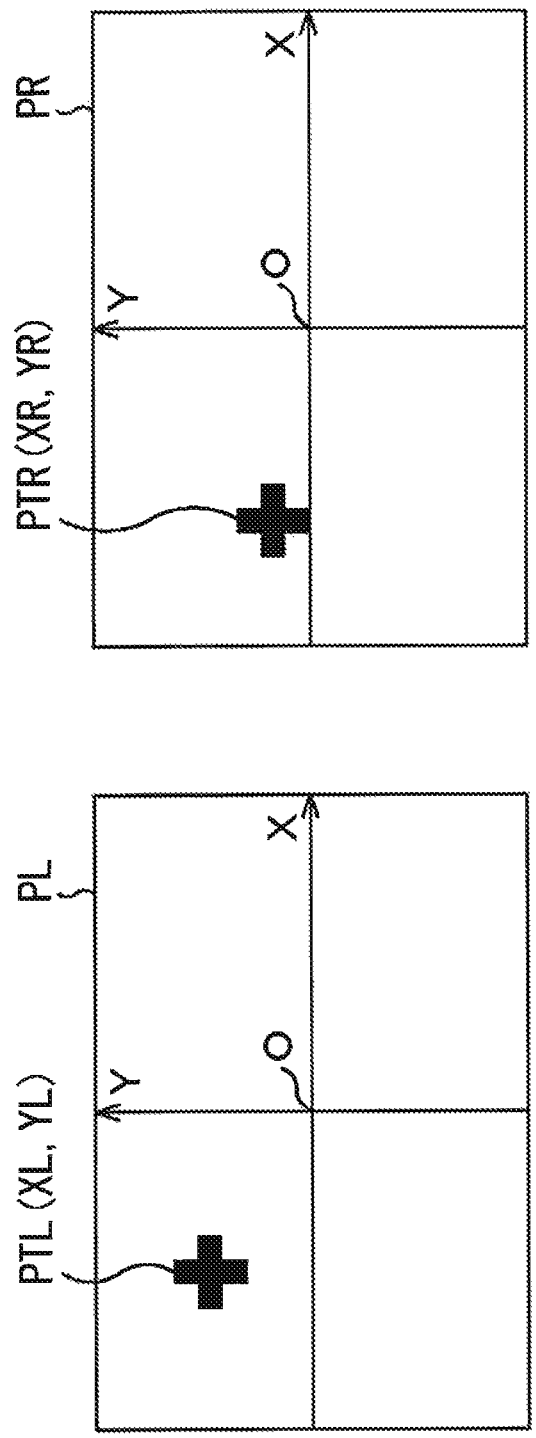
FIG. 7 is a diagram to describe an image taken by a stereo camera.
Figure 8:
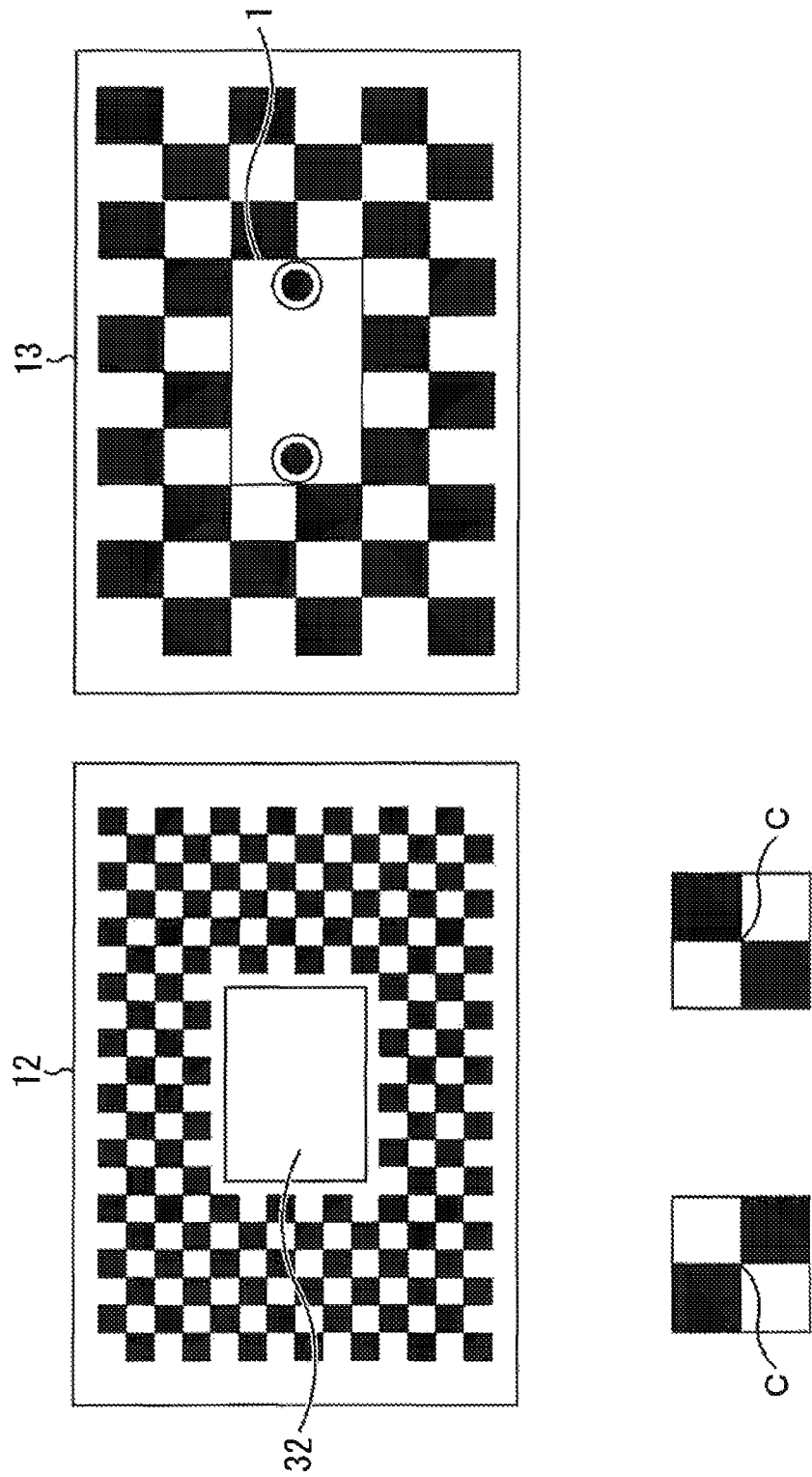
FIG. 8 is a diagram to describe an example of a chart pattern.

Here, in the example illustrated in FIG. 7, for ease of understanding, although a case is shown where the number of patterns is one, chart patterns 12 and 13 are actually assumed to have a configuration including a plurality of patterns formed with lattice points or the like as illustrated in the upper side of FIG. 8, for example. Subsequently, in the chart patterns 12 and 13 in FIG. 8, as illustrated in the lower side of FIG. 8, the position of corner C that is the intersection of the edge parts of black and white masses is detected as the feature point coordinates.

Moreover, in the upper side of FIG. 8, the black and white masses are set larger in the chart pattern 13 than the chart pattern 12. In a case where the distance between the imaging positions of the imaging units 21-2 and 21-2 of the stereo camera 11 and the chart pattern 12 is A, since the chart pattern 13 is photographed by the imaging units 21-2 and 21-2 of the stereo camera 11 in a state where it is mirrored in the mirror 32, it is actually photographed as a chart pattern provided in the position separated by a substantially distance of 2A from the stereo camera 11, and therefore they are set larger than the chart pattern 12. Here, as the distance between the stereo camera 11 and the chart pattern 12, various distances can be set. Moreover, the size of the chart patterns 12 and 13 is not limited to the one illustrated in the upper side of FIG. 8.

FIG. 9 illustrates a detection result of the feature point coordinates found from the images taken by the stereo camera 11 by the use of the chart patterns 12 and 13 of FIG. 8, which is found by the feature point coordinate detection unit 101 as above. That is, regarding images PL' and PR' in FIG. 9, the feature point coordinates found from images PL and PR taken by the imaging units 21-1 and 21-2 of the stereo camera 11 are expressed as images PL' and PR' including the "+" sign, by the use of the chart patterns 12 and 13 in FIG. 8. The numerical value in the horizontal direction denotes the coordinate value indicating the pixel position in the X direction using the image center as the origin, and the numerical value in the vertical direction denotes the coordinate value indicating the pixel position in the Y direction using the image center as the origin. Moreover, regions ZL and ZR are the feature point coordinates which are found by a pattern of the chart pattern 13 mirrored in the mirror 32 in images PL' and PR'.

Therefore, the feature point coordinates inside regions ZL and ZR are coordinates of a pattern in a position which is more distant from the imaging area of the imaging units 21-1 and 21-2 than the feature point coordinates outside regions ZL and ZR. In contrast, the feature point coordinates outside regions ZL and ZR are coordinates of a pattern in a position which is closer to the imaging area of the imaging units 21-1 and 21-2 than the feature point coordinates inside regions ZL and ZR.

In step S13, the parameter estimation unit 102 estimates correction parameter ($\theta$, $\varphi$, $\alpha$, $\varphi$base, $\alpha$base) used for calibration on the basis of information on the feature point coordinates, and supplies estimated correction parameter ($\theta$, $\varphi$, $\alpha$, $\varphi$base, $\alpha$base) to the parameter storage unit 103.

Figure 10:
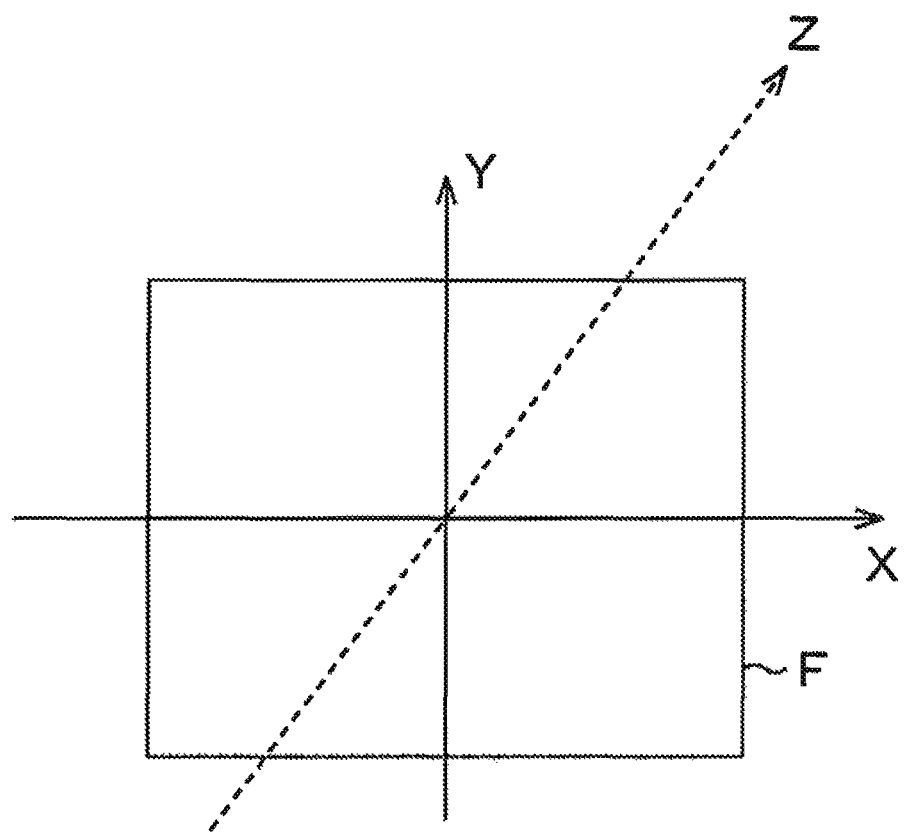
FIG. 10 is a diagram to define a correction parameter requested for calibration.

Here, when an estimation method of correction parameter ($\theta$, $\varphi$, $\alpha$, $\varphi$base, $\alpha$base) is described in detail, the following coordinate system is defined. That is, as illustrated in FIG. 10, the center position of imaging area F of the images taken by the imaging units 21-1 and 21-2 is assumed as the origin, the horizontal right direction is assumed to be positive and the X axis is defined, the vertical upper direction is assumed to be positive and the Y axis is defined, and the direction away from imaging area F is assumed to be positive and the Z axis is defined.

Figure 11:
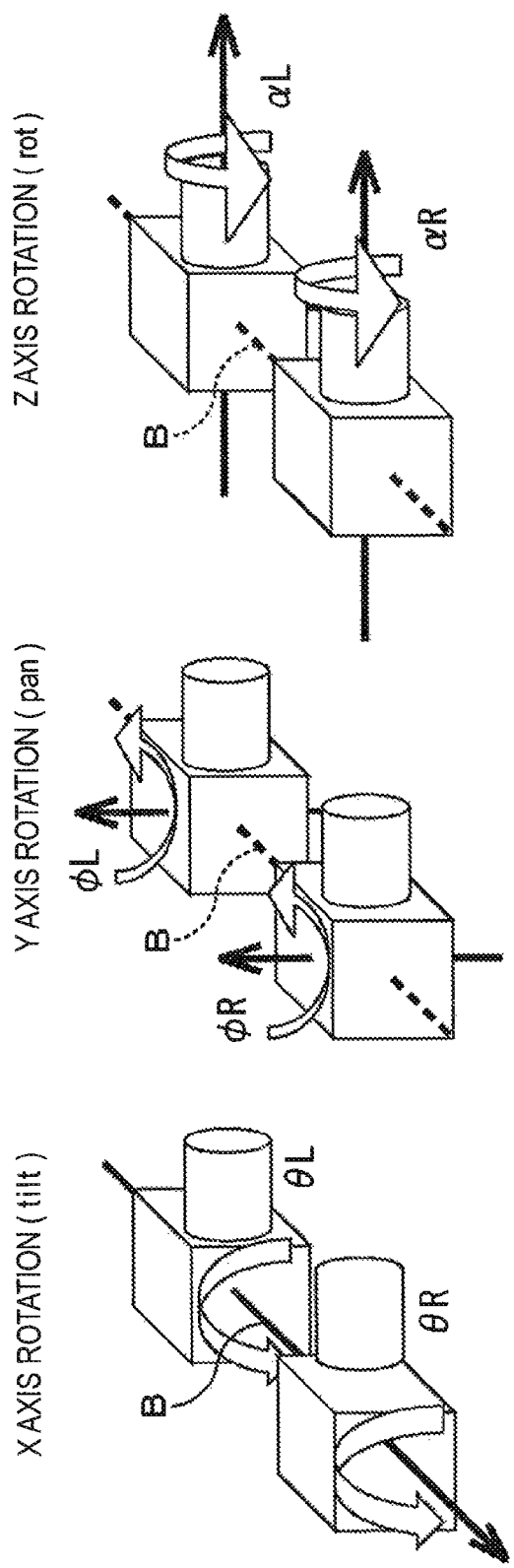
FIG. 11 is a diagram to define a correction parameter based on a baseline requested for calibration.

In addition, as illustrated in the left part of FIG. 11, when the counterclockwise direction is assumed to be positive with respect to the X axis (including baseline B) of the imaging units 21-1 and 21-2 where the positive direction of the X axis is directed to the observer, the rotation (tilt) angles are defined as $\theta R$ and $\theta L$ respectively. Moreover, as illustrated in the center part of FIG. 11, when the counterclockwise direction is assumed to be positive with respect to the Y axis of the imaging units 21-1 and 21-2 where the positive direction of the Y axis is directed to the observer, the rotation (pan) angles are defined as $\varphi R$ and $\varphi L$ respectively. Furthermore, as illustrated in the right part of FIG. 11, when the counterclockwise direction is assumed to be positive with respect to the Z axis of the imaging units 21-1 and 21-2 where the positive direction of the Z axis is directed to the observer, the rotation (rot) angles are defined as $\alpha R$ and $\alpha L$ respectively.

That is, the purpose of calibration of the stereo camera 11 is to satisfy the epipolar constraint when baseline B is processed as an epipolar line, by estimating the rotation angles ($\theta L$, $\theta R$, $\varphi L$, $\varphi R$, $\alpha L$, $\alpha R$) of each axis, and to calculate a correction parameter such that the right and left feature points are set on the identical baseline (i.e., epipolar line).

However, regarding θL and θR which are the rotation angles with respect to the X axis, there is no constraint with respect to baseline B, and it only has to calculate the relative angle (θL−θR) between the right and left.

When the above is organized, when the relative angles between the right and left imaging units 21-1 and 21-2 (i.e., differences of the rotation angles between the right and left imaging units 21-1 and 21-2 with respect to the XYZ axes) are assumed to be θ, φ and α and the absolute angles (with respect to the YZ axes) based on baseline B are assumed to be φ_base and α_base, they can be expressed by following Equations (5) to (9).

$$\theta = \theta L - \theta R \tag{5}$$

$$\varphi = \varphi L - \varphi R \tag{6}$$

$$\alpha = \alpha L - \alpha R \tag{7}$$

$$\varphi\_base = 0.5 \times (\theta L + \theta R) \tag{8}$$

$$\alpha\_base = 0.5 * (\alpha L + \alpha R) \tag{9}$$

Here, θ, φ and α denote parameters indicating the relative angles between the imaging units 21-1 and 21-2. To be more specific, θ denotes a parameter that expresses the vertical gap of the imaging units 21-1 and 21-2. Further, φ denotes a parameter that expresses the absolute distance gap of the imaging units 21-1 and 21-2. Further, α denotes a parameter that expresses the rotation gap of the imaging units 21-1 and 21-2. In addition, φ_base and α_base denote parameters that express the absolute angles constrained with respect to baseline B. That is, φ_base denotes an absolute angle around the Y axis with respect to baseline B and α_base denotes an absolute value around the Z axis with respect to baseline B, that is, the Y gap amount which varies by the disparity.

The parameter estimation unit 102 estimates these correction parameters (θ, φ, α, φbase, αbase) as follows.

That is, when the absolute coordinates of certain unprocessed feature point p is assumed to be (X, Y, Z) and the distance between the imaging units 21-2 and 21-2 on baselines B is assumed to be b, actual coordinates (x_L, y_L, z_L) and (x_R, y_R, z_R) in the right and left imaging units 21-1 and 21-2 are expressed like following Equations (10) and (11).

$$\begin{pmatrix} x_L \\ y_L \\ z_L \end{pmatrix} = R_x(\theta) R_y(\phi_{base} + \phi) R_z(\alpha_{base} + \alpha) \begin{bmatrix} x + 0.5b \\ y \\ z \end{bmatrix} \tag{10}$$

$$\begin{pmatrix} x_R \\ y_R \\ z_R \end{pmatrix} = R_x(\theta) R_y(\phi_{base} - \phi) R_z(\alpha_{base} - \alpha) \begin{bmatrix} x - 0.5b \\ y \\ z \end{bmatrix} \tag{11}$$

Here, Rx, Ry and Rz denote rotation matrixes around the X, Y and Z axes, and are expressed as following Equations (12) to (14).

$$R_x(\theta) = \begin{pmatrix} 1 & 0 & 0 \\ 0 & \cos\theta & -\sin\theta \\ 0 & \sin\theta & \cos\theta \end{pmatrix} \tag{12}$$

$$R_y(\phi) = \begin{pmatrix} \cos\phi & 0 & \sin\phi \\ 0 & 1 & 0 \\ -\sin\phi & 0 & \cos\phi \end{pmatrix} \tag{13}$$

$$R_z(\alpha) = \begin{pmatrix} \cos\alpha & -\sin\alpha & 0 \\ \sin\alpha & \cos\alpha & 0 \\ 0 & 0 & 1 \end{pmatrix} \tag{14}$$

Moreover, at this time (XL, YL) and (XR, YR) are expressed as following Equations (15) and (16).

$$\begin{pmatrix} X_L \\ Y_L \end{pmatrix} = \begin{pmatrix} \frac{x_L}{z_L} \\ \frac{y_L}{z_L} \end{pmatrix} \tag{15}$$

$$\begin{pmatrix} X_R \\ Y_R \end{pmatrix} = \begin{pmatrix} \frac{x_R}{z_R} \\ \frac{y_R}{z_R} \end{pmatrix} \tag{16}$$

The parameter estimation unit 102 estimates the rotation angles (θ, φ, α, φbase, αbase) of each axis on the basis of the gap amount of above-mentioned YL and YR observed on the imaging area.

Here, by Equations (14) and (5) to (9) in "Journal Information processing,' May 1990, Vol. 31, No. 5, 'Self calibration of stereo camera,' written by Humiaki Tomita and Hironobu Takahashi" (hereafter referred to as "reference"), when it is presumed that there is no difference in the enlargement ratio between the right and left lens, the difference (YL−YR) in the Y-coordinate of feature points in the images taken by the right and left imaging units 21-1 and 21-2 can be expressed by an approximate equation like following Equation (17).

$$-(Y_L - Y_R) \cong -(Y_L Y_R + 1)\theta + X_L Y_R \left(\phi_{base} + \frac{\phi}{2}\right) + \\ X_L \left(\alpha_{base} + \frac{\alpha}{2}\right) - X_R Y_L \left(\phi_{base} - \frac{\phi}{2}\right) - X_R \left(\alpha_{base} - \frac{\alpha}{2}\right) \tag{17}$$

Here, when the middle point of right and left features (XL, YL) and (XR, YR) is expressed as X=0.5×(XL−XR) and Y=0.5×(YL−YR) and the difference between feature points (XL, YL) and (XR, YR) is expressed as ΔX=(XL−XR) and ΔY=(YL−YR), Equation (17) can be transformed like following Equation (18).

$$-(Y_L - Y_R) \cong -\left(\left(Y + \frac{\Delta Y}{2}\right)\left(Y - \frac{\Delta Y}{2}\right) + 1\right)\theta + \\ \left(X + \frac{\Delta X}{2}\right)\left(Y - \frac{\Delta Y}{2}\right)\left(\phi_{base} + \frac{\phi}{2}\right) + \left(X + \frac{\Delta X}{2}\right)\left(\alpha_{base} + \frac{\alpha}{2}\right) - \\ \left(X - \frac{\Delta X}{2}\right)\left(Y + \frac{\Delta Y}{2}\right)\left(\phi_{base} - \frac{\phi}{2}\right) - \left(X - \frac{\Delta X}{2}\right)\left(\alpha_{base} - \frac{\alpha}{2}\right) \tag{18}$$

When the description in Equation (18) is expressed by each axis rotation amount, it can be expressed by following Equation (19).

$$-(Y_L - Y_R) \cong \theta\left\{-\left(\left(Y^2 - \left(\frac{\Delta Y}{2}\right)^2\right) + 1\right)\right\} + \quad (19)$$

$$\phi_{base}\left\{\left(X + \frac{\Delta X}{2}\right)\left(Y - \frac{\Delta Y}{2}\right) - \left(X - \frac{\Delta X}{2}\right)\left(Y + \frac{\Delta Y}{2}\right)\right\} +$$

$$\frac{1}{2}\phi\left\{\left(X + \frac{\Delta X}{2}\right)\left(Y - \frac{\Delta Y}{2}\right) + \left(X - \frac{\Delta X}{2}\right)\left(Y + \frac{\Delta Y}{2}\right)\right\} +$$

$$\phi_{base}\left\{\left(X + \frac{\Delta X}{2}\right) - \left(X - \frac{\Delta X}{2}\right)\right\} + \frac{1}{2}\alpha\left\{\left(X + \frac{\Delta X}{2}\right) + \left(X - \frac{\Delta X}{2}\right)\right\} =$$

$$-\left(\left(Y^2 - \left(\frac{\Delta Y}{2}\right)^2\right) + 1\right)\theta + \phi(XY - \Delta X \Delta Y) +$$

$$\phi_{base}(\Delta XY - X\Delta Y) + \alpha(X) + \alpha_{base}(\Delta X)$$

Since $\Delta Y$ in expression (19) becomes $\Delta Y \approx 0$ when the epipolar constraint is satisfied and the calibration is matched, if $\Delta X$ when the calibration is performed, that is, ideal disparity d_calibrated is already known, Equation (19) can be approximated like following Equation (20).

$$-(Y_L - Y_R) \cong -(Y^2 + 1)\theta + (XY)\varphi + (d_{calibrated}Y)\varphi_{base} + (X)\alpha + (d_{calibrated})\alpha_{base} \quad (20)$$

Here, as illustrated in FIG. 2, since the depths of the chart patterns 12 and 13 are already known (i.e., Z0 and Z0+Z1), if the focal distance is presumed to be 1, each ideal disparity (d_calibrated) can be calculated as known parameters expressed by following Equations (21) and (22).

$$d_{pattern1} = \frac{b}{z_0} \quad (21)$$

$$d_{pattern2} = \frac{b}{z_1 + z_2} \quad (22)$$

Therefore, by substituting Y-coordinate difference (YL−YR) in Equation (20) according to the pattern depth, this can be expressed using middle point (X, Y) of the right and left camera feature point coordinates and θ, φ, α, φ_base and α_base which are the rotation parameters of the stereo camera 11. That is, as shown in following Equation (23), error function e in each feature point can be defined.

$$e = (Y_L - Y_R) - (Y^2 + 1)\theta + (XY)\varphi + (d_{calibrated}Y)\varphi_{base} + (X)\alpha + (d_{calibrated})\alpha_{base} \quad (23)$$

The parameter estimation unit 102 estimates θ, φ, α, φ_base, and α_base so as to minimize error function e defined by Equation (23) with respect to each feature point. Here, regarding minimization of this error function, it is known to perform it using many feature points in order to secure the robustness to noise. As an estimation method of these multiple variables, for example, it is known to apply the Levenberg-Marquardt method.

Here, it returns to the explanation of the flowchart.

In step S14, the parameter storage unit 103 causes the parameter storage unit 61 of the stereo camera 11 to save and store the correction parameters (θ, φ, α, φbase, αbase) supplied from the parameter estimation unit 102.

By the above-mentioned processing, by providing a mirror as illustrated in FIG. 1, regarding the imaging direction of the imaging units 21-1 and 21-2 at the time of calibration, it is possible to suppress a physically requested depth amount and realize calibration using the chart patterns 12 and 13 with different depths. As a result, since it is possible to perform the calibration in a smaller space, it is possible to realize the reduction of the manufacturing cost.

Moreover, by expressing it using parameters separated into φ_base and α_base which are absolute rotational elements constrained by the baseline and relative rotational elements θ, φ and α which are gap elements of relative rotation angle, it is possible to estimate a correction parameter (i.e., angle) based on the Y gap between the right and left (i.e., error in the vertical direction with respect to baseline B), using an approximate equation as shown in Equation (17).

Moreover, by separately expressing rotation angle elements with different characteristics, since mutual interference is reduced, it is possible to estimate a correction parameter more robustly.

In addition, in the estimation of the absolute rotational elements, by estimating the correction parameter while giving disparity with an assumption that the depths from the imaging units 21-1 and 21-2 to the chart patterns 12 and 13 are already known, it is possible to reduce the influence of feature point detection error and estimate a rotation angle more robustly.

Also, although an example has been described above where the depths of the chart patterns 12 and 13 are assumed to be already known and disparity d_calibrated is given to perform rotation angle estimation, the estimation may be performed only with coordinate information on feature points by the method described in the above-mentioned reference.

Moreover, as described in JP 2011-253376A, a rotation angle to minimize an evaluation function may be estimated by photographing texture surfaces with different depths and using the stereo matching error amount for the evaluation function of the correction parameter.

<Depth Detection Processing>

Figure 12:
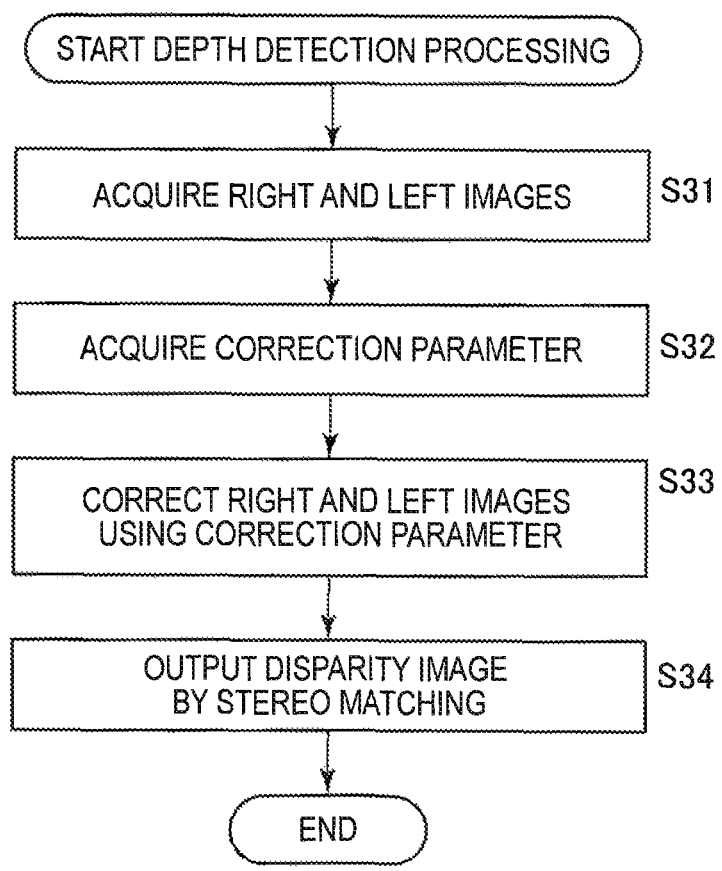
FIG. 12 is a flowchart to describe depth detection processing.

Next, depth detection processing is described with reference to the flowchart in FIG. 12.

In step S31, the stereo camera 11 takes right and left images by the use of the imaging units 21-1 and 21-2 and supplies them to the depth detection unit 15. The correction unit 122 of the depth detection unit 15 acquires the right and left image supplied from the stereo camera 11.

In step S32, the parameter acquisition unit 121 accesses the parameter storage unit 61 of the stereo camera 11, reads and acquires the stored correction parameters (θ, φ, α, φbase, αbase) and supplies them to the correction unit 122.

Figure 13:
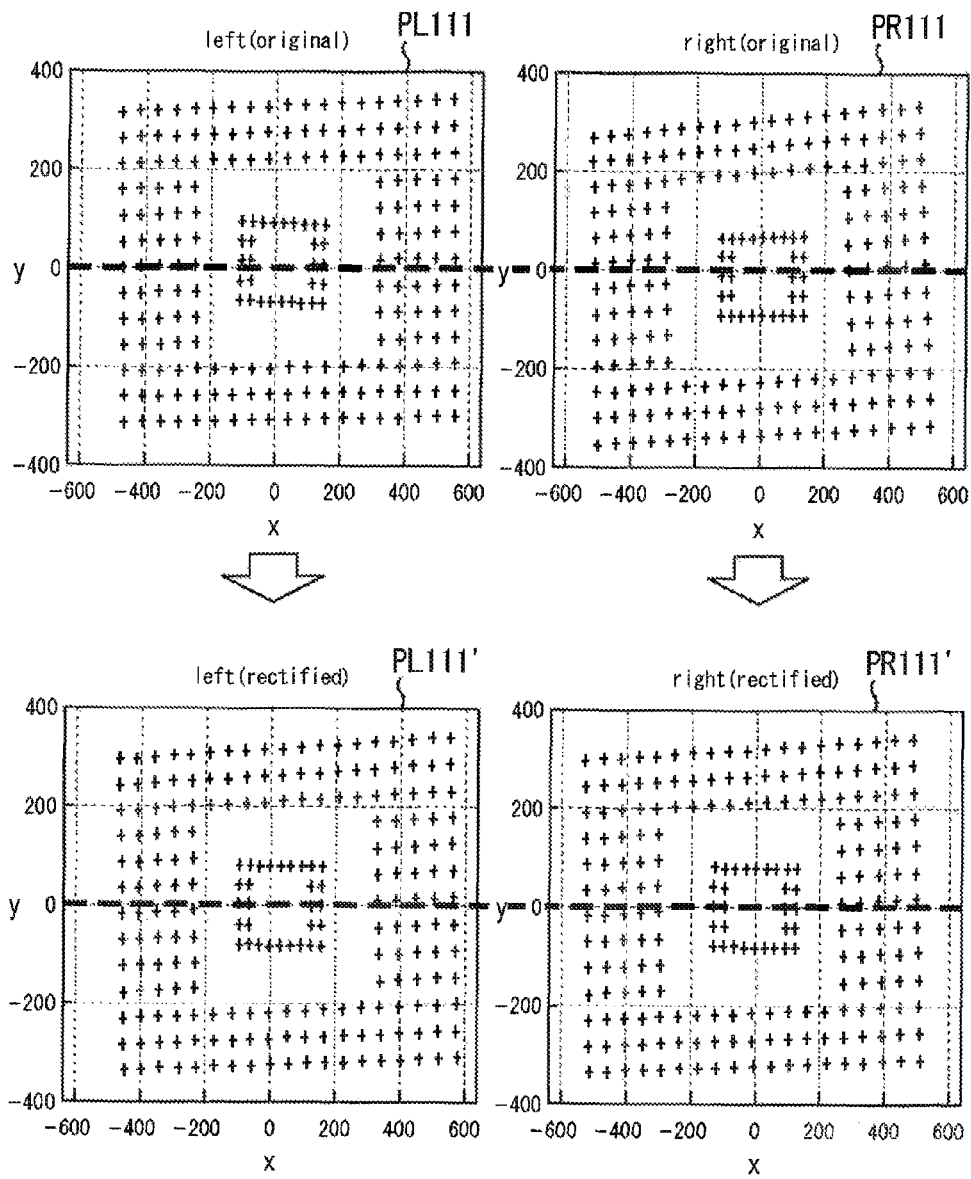
FIG. 13 is a diagram to describe feature points found by a photographed chart pattern before and after calibration.

In step S33, the correction unit 122 corrects the acquired right and left images by the correction parameters (θ, φ, α, φbase, αbase) and supplies the corrected images to the stereo matching unit 123. That is, the images are corrected by the correction parameters (θ, φ, α, φbase, αbase) such that the gap is canceled. As a result, for example, by correcting images PL111 and PR111 including the coordinates of feature points extracted from the images taken in the imaging units 21-1 and 21-2 illustrated in the upper part of FIG. 13, by the correction parameters, they are corrected like images PL111' and PR111' illustrated in the lower part of FIG. 13.

In step S34, the stereo matching unit 123 performs stereo matching processing on the basis of the corrected right and left images, calculates the distance in a pixel unit, and, as a depth processing result, generates and outputs a disparity image including a pixel value based on the pixel unit distance. Also, regarding details of the stereo matching, for example, see Yuichi Ohta, Takeo Kanade Stereo by Intra- and Inter-Scanline Search Using Dynamic Programming IEEE Transactions on Pattern Analysis and Machine Intelligence and 1985.

By the above-mentioned processing, it is possible to realize the depth detection processing by the use of the correction parameters calculated by the calibration processing using a chart pattern including a mirror.

Moreover, even in a limited narrow space, since it is possible to adequately correct the imaging direction of the imaging units 21-1 and 21-2 of the stereo camera 11, it is possible to reduce the manufacturing cost of the stereo camera 11 and acquire a disparity image of high accuracy.

Here, although an example has been described above where correction parameters are calculated for the purpose of performing the depth detection processing by the depth detection unit 15, it may be possible to calculate correction parameters with respect to a stereo camera for the purpose of taking other images. Moreover, although an example has been described above where correction parameters to correct two imaging units 21 including the right and left imaging units 21-1 and 21-2 are calculated, it may be possible to use more imaging units than two.

Figure 14:
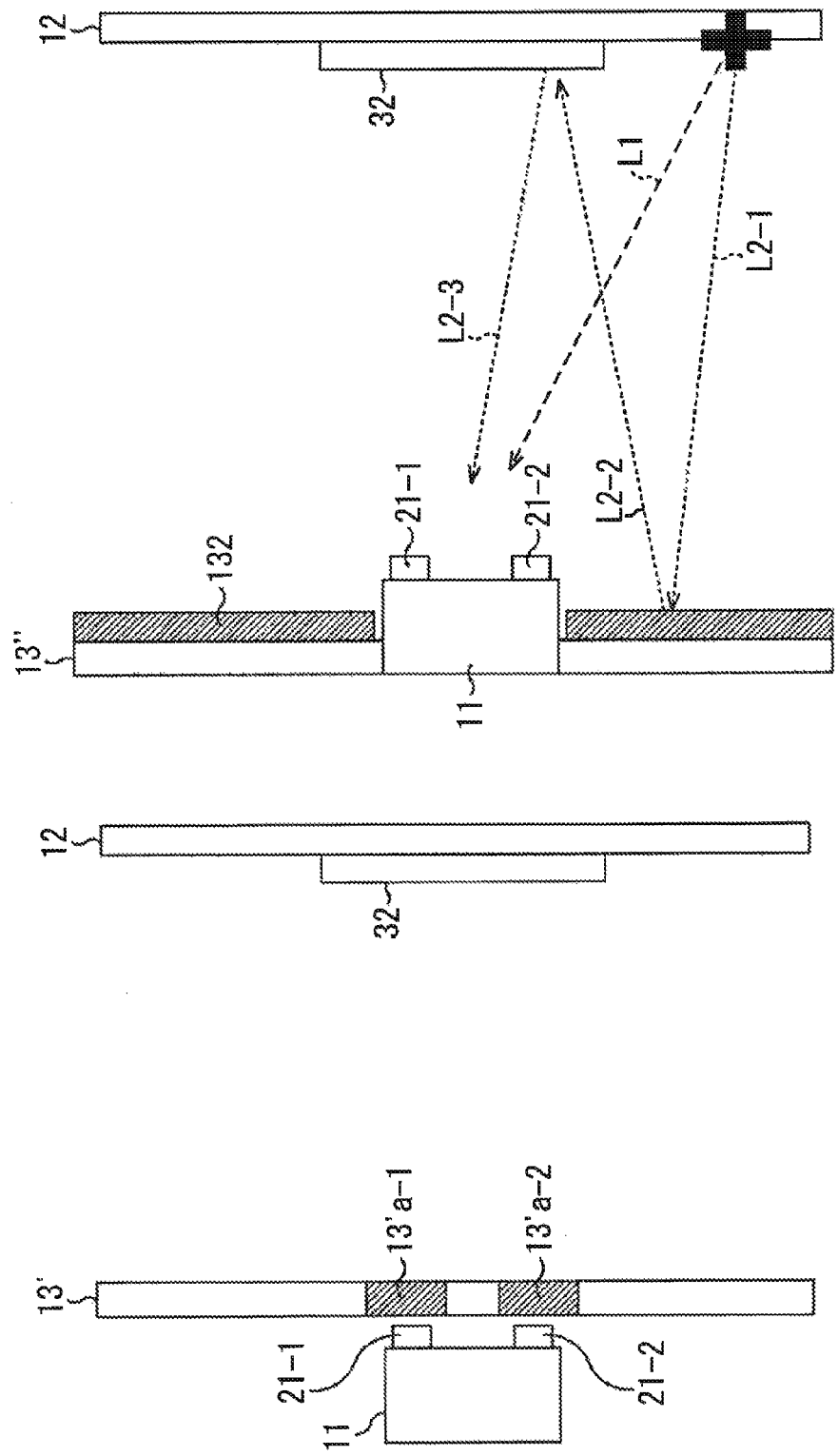
FIG. 14 is a diagram illustrating another layout of a stereo camera and chart pattern.

Moreover, as illustrated in FIG. 2, although an example has been described above where the stereo camera 11 is arranged between the chart patterns 12 and 13, other configurations are possible if it is possible to photograph a chart pattern or texture with a different depth. For example, as illustrated in the left part of FIG. 14, instead of the chart pattern 13, a chart pattern 13' in which hole parts 13'a-1 and 13'a-2 are provided in positions corresponding to the imaging units 21-1 and 21-2 may be provided between the stereo camera 11 and the chart pattern 12 while it is connected to the imaging units 21-1 and 21-2 of the stereo camera 11. Moreover, as illustrated in the right part of FIG. 14, a mirror 132 may be provided to the entire surface of the chart pattern 13 so as to take an image indicated by optical path L1 and an image in which optical paths with different depths are the sum of optical paths L2-1 to L2-3.

According to the above, even in a limited space, it is possible to adequately correct the imaging direction of the imaging units in the stereo camera including the plurality of imaging units, and realize imaging by the use of the stereo camera at high accuracy.

The above-described series of processing may be performed by hardware or may be performed by software. When the series of processing is performed by software, a program forming the software is installed into a computer that is incorporated in a dedicated hardware, or installed from a storage medium into a general-purpose personal computer, for example, that can perform various types of functions by installing various types of programs.

Figure 15:
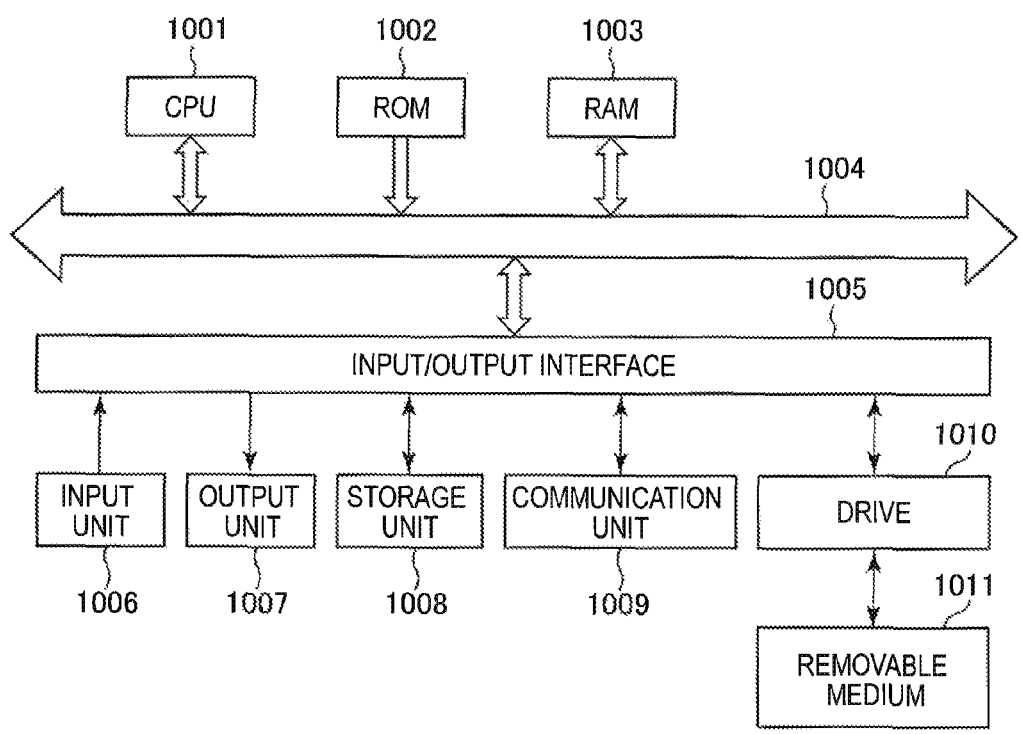
FIG. 15 is a diagram to describe a configuration example of a general-purpose personal computer.

FIG. 15 illustrates a configuration example of a general-purpose personal computer. This personal computer incorporates a CPU (Central Processing Unit) 1001. The CPU 1001 is connected to an input/output interface 1005 through a bus 1004. The bus 1004 is connected to a ROM (Read Only Memory) 1002 and a RAM (Random Access Memory) 1003.

The input/output interface 1005 is connected to: an input unit 1006 including a keyboard to input an operation command by the user and an input device such as a mouse; an output unit 1007 that outputs an image of an processing operation screen or processing result to a display device; a storage unit 1008 including a hard disk drive storing programs and various kinds of data; and a communication unit 1009 that performs communication processing through a network represented by the Internet by the use of the LAN (Local Area Network). Moreover, a drive 1010 to read and write data is connected to a removable medium 1011 such as a magnetic disk (including a flexible disk), an optical disc (including a CD-ROM (Compact Disc-Read Only Memory) and a DVD (Digital Versatile Disc)), a magneto optical disk (including a MD (Mini Disc)) and a semiconductor memory.

The CPU 1001 performs various kinds of processing according to programs stored in the ROM 1002 or programs which are read from the removable medium 1011 such as the magnetic disk, the optical disc, the magneto optical disk and the semiconductor memory, installed in the storage unit 1008 and loaded from the storage unit 1008 onto the RAM 1003. The RAM 1003 adequately stores data demanded to perform various kinds of processing in the CPU 1001.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged media or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission media and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flowcharts can be executed by one apparatus or by allocating a plurality of apparatuses.

In addition, in the case where a plurality of processes is included in one step, the plurality of processes included in this one step can be executed by one apparatus or by allocating a plurality of apparatuses.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a plurality of imaging units included in a stereo camera, the plurality of imaging units being configured to image a first chart pattern including a pattern that is a plurality of feature points and a mirror surface; and
a correction parameter calculation unit configured to calculate a correction parameter that corrects a gap of the plurality of imaging units, based on the pattern included in the first chart pattern imaged by the plurality of imaging units and a pattern mirrored in the mirror surface.

(2) The image processing apparatus according to (1), wherein the correction parameter calculation unit calculates a correction parameter that corrects a gap in three axis directions of two of the plurality of imaging units and a gap of a rotation angle of the two imaging units with respect to a baseline.

(3) The image processing apparatus according to (2), wherein the gap of the rotation angle of the two imaging units with respect to the baseline includes a gap of a rotation angle that is vertical to the baseline and is obtained by regarding an imaging direction of the imaging units as an axis, and a gap of a rotation angle that is vertical to the baseline and is obtained by regarding a direction vertical to the imaging direction of the imaging unit as an axis.

(4) The image processing apparatus according to (2), wherein the correction parameter calculation unit calculates the correction parameter that corrects the gap in the three axis directions of the two imaging units and the gap of the rotation angle of the two imaging units with respect to the baseline, using a distance from the imaging units to the first chart pattern, a distance from the imaging units to the mirror surface provided in the first chart pattern, and a distance between the first chart pattern and a second chart pattern as a known disparity.

(5) The image processing apparatus according to (1), wherein the plurality of imaging units image the pattern included in the first chart pattern and a pattern included in a second chart pattern mirrored in the mirror surface.

(6) The image processing apparatus according to (5), wherein the second chart pattern includes a mirror surface, and
wherein the plurality of imaging units image the pattern included in the first chart pattern and a pattern which is mirrored in the mirror surface of the first chart pattern, mirrored in the mirror surface forming the second chart pattern and included in the first chart pattern.

(7) An image processing method including:
performing, by a plurality of imaging units included in a stereo camera image, imaging processing of imaging a first chart pattern including a pattern that is a plurality of feature points and a mirror surface; and
performing correction parameter calculation processing of calculating a correction parameter that corrects a gap of the plurality of imaging units, based on a pattern included in a chart pattern imaged in multiple times of the imaging processing and a pattern mirrored in the mirror surface.

(8) A program for causing a computer to execute the processing of:
imaging a first chart pattern including a pattern that is a plurality of feature points and a mirror surface, by a plurality of imaging units included in a stereo camera; and
calculating a correction parameter that corrects a gap of the plurality of imaging units, based on a pattern included in a chart pattern imaged in multiple times of processing in the imaging step and a pattern mirrored in the mirror surface.

(9) An image processing system including:
an image processing apparatus including a plurality of imaging units; and
a chart pattern configured to calibrates on an imaging direction of the imaging units,
wherein the chart pattern includes a pattern that is a plurality of feature points and provided in a position facing the plurality of imaging units, and a mirror surface, and
wherein the image processing apparatus includes the plurality of imaging units that are included in a stereo camera and image the chart pattern, and a correction parameter calculation unit that calculates a correction parameter which corrects a gap of the plurality of imaging units, based on the pattern included in the chart pattern imaged by the plurality of imaging units and a pattern mirrored in the mirror surface.

What is claimed is:
1. An image processing apparatus comprising:
a plurality of imaging units included in a stereo camera, the plurality of imaging units being configured to image a first chart pattern including a pattern that is a plurality of feature points and a mirror surface; and
a correction parameter calculation unit configured to calculate a correction parameter that corrects a gap of the plurality of imaging units, based on the pattern included in the first chart pattern imaged by the plurality of imaging units and a pattern mirrored in the mirror surface,
wherein the plurality of imaging unit and the correction parameter calculation unit are each implemented via at least one processor.

2. The image processing apparatus according to claim 1, wherein the correction parameter calculation unit calculates a correction parameter that corrects a gap in three axis directions of two of the plurality of imaging units and a gap of a rotation angle of the two imaging units with respect to a baseline.

3. The image processing apparatus according to claim 2, wherein the gap of the rotation angle of the two imaging units with respect to the baseline includes a gap of a rotation angle that is vertical to the baseline and is obtained by regarding an imaging direction of the imaging units as an axis, and a gap of a rotation angle that is vertical to the baseline and is obtained by regarding a direction vertical to the imaging direction of the imaging unit as an axis.

4. The image processing apparatus according to claim 2, wherein the correction parameter calculation unit calculates the correction parameter that corrects the gap in the three axis directions of the two imaging units and the gap of the rotation angle of the two imaging units with respect to the baseline, using a distance from the imaging units to the first chart pattern, a distance from the imaging units to the mirror surface provided in the first chart pattern, and a distance between the first chart pattern and a second chart pattern as a known disparity.

5. The image processing apparatus according to claim 1, wherein the plurality of imaging units image the pattern included in the first chart pattern and a pattern included in a second chart pattern mirrored in the mirror surface.

6. The image processing apparatus according to claim 5, wherein the second chart pattern includes a mirror surface, and
wherein the plurality of imaging units image the pattern included in the first chart pattern and a pattern which is mirrored in the mirror surface of the first chart pattern, mirrored in the mirror surface forming the second chart pattern and included in the first chart pattern.

7. An image processing method comprising:

performing, by a plurality of imaging units included in a stereo camera image, imaging processing of imaging a first chart pattern including a pattern that is a plurality of feature points and a mirror surface; and performing correction parameter calculation processing of calculating a correction parameter that corrects a gap of the plurality of imaging units, based on a pattern included in a chart pattern imaged in multiple times of the imaging processing and a pattern mirrored in the mirror surface.

8. A non-transitory computer-readable medium having embodied thereon a program, which when executed by a computer causes the computer to execute a method, the method comprising:

imaging a first chart pattern including a pattern that is a plurality of feature points and a mirror surface, by a plurality of imaging units included in a stereo camera; and calculating a correction parameter that corrects a gap of the plurality of imaging units, based on a pattern included in a chart pattern imaged in multiple times of processing in the imaging step and a pattern mirrored in the mirror surface.

9. An image processing system comprising:

an image processing apparatus including a plurality of imaging units; and a chart pattern configured to calibrate on an imaging direction of the imaging units, wherein the chart pattern includes a pattern that is a plurality of feature points and provided in a position facing the plurality of imaging units, and a mirror surface, wherein the image processing apparatus includes the plurality of imaging units that are included in a stereo camera and image the chart pattern, and a correction parameter calculation unit that calculates a correction parameter which corrects a gap of the plurality of imaging units, based on the pattern included in the chart pattern imaged by the plurality of imaging units and a pattern mirrored in the mirror surface, and wherein the plurality of imaging unit and the correction parameter calculation unit are each implemented via at least one processor.

10. The image processing apparatus according to claim 1, wherein the pattern and the mirrored pattern are imaged at a same time as the first chart pattern.

11. The image processing apparatus according to claim 1, wherein the correction parameter calculation unit calculates the correction parameter that corrects the gap of the plurality of imaging units, based on the pattern included in the first chart pattern located at a position in front of the plurality of imaging units and imaged by the plurality of imaging units and a pattern located at a position located behind the plurality of imaging units and mirrored in the mirror surface.

12. The image processing apparatus according to claim 1, wherein the pattern mirrored in the mirrored surface is a texture pattern.

13. The image processing apparatus according to claim 1, wherein the mirror surface and the pattern included in the first chart pattern are both positioned within a same planar surface.

* * * * *